(No Model.)
H. ADLER.
BURNER FOR BURNING GASEOUS FUEL.
No. 485,594. Patented Nov. 1, 1892.
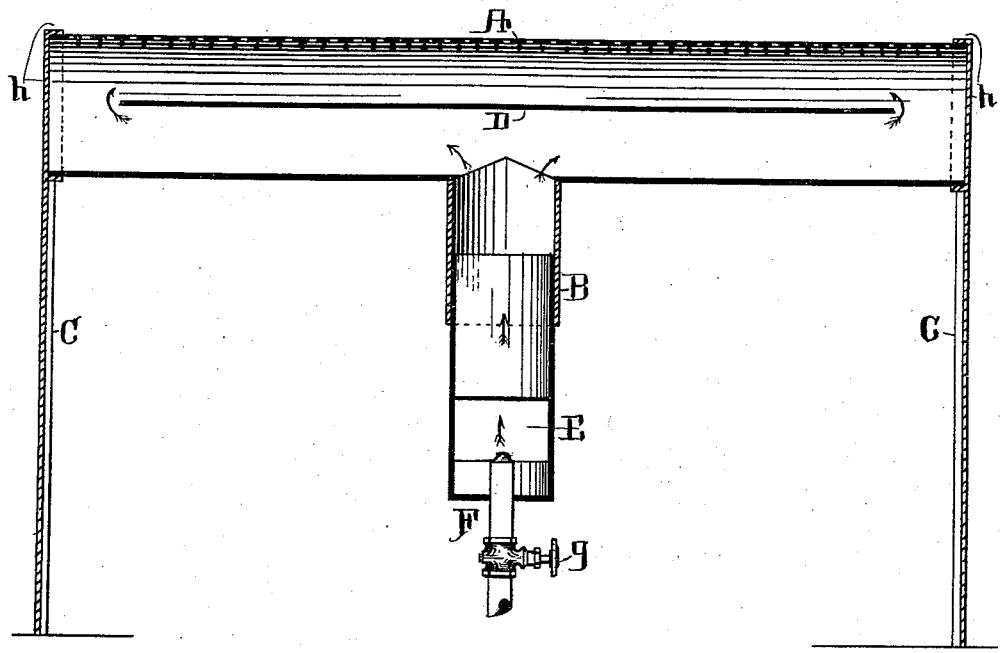
Witnesses:
George Henry Harvey
C. S. Johnston
Inventor.
Henry Adler
By A. C. Johnston
Attorney

UNITED STATES PATENT OFFICE.

HENRY ADLER, OF ALLEGHENY, PENNSYLVANIA.

BURNER FOR BURNING GASEOUS FUEL.

SPECIFICATION forming part of Letters Patent No. 485,594, dated November 1, 1892.

Application filed November 20, 1891. Serial No. 412,582. (No model.)

*To all whom it may concern:*

Be it known that I, HENRY ADLER, of Allegheny, in the county of Allegheny and State of Pennsylvania, have invented a new and useful Improvement in Burners for Burning Gaseous Fuel; and I do hereby declare the following to be a full, clear, and exact description thereof.

My invention relates to an improvement in burners for burning gaseous fuel; and it consists in the combination and arrangement of parts hereinafter described, and shown in the accompanying drawing.

To enable others skilled in the art with which my invention is most nearly connected, I will proceed to describe its construction and operation.

In the drawing, A represents the gas and air chamber and is made cylindrical and provided on its upper surface with a number of openings for the outlet of the mixed air and gas. To each end of the gas-chamber is attached legs or supports C, having a flange $h$, which slips or fits on the ends of the chamber A, thereby closing up the ends. Within the gas and air chamber is a sheet-metal piece D for spreading and mixing the gas and air when they enter the chamber A.

My improved burner is provided with an adjustable mixer B, susceptible of being adjusted up and down. This mixer has an opening E for the admission of air.

F is the gas-supply pipe, having the usual stop-cock $g$.

The operation is as follows: Gas from the supply-pipe $g$ passes through the mixer B, draws with sufficient air through the opening E, and, both entering the gas-chamber A, will strike the under side of the plate D, and, becoming thoroughly mixed, will divide right and left and pass out through the openings in the chamber A and are ignited.

It is often the case that the gas-fittings are not placed in the center of the hearth, and it becomes difficult to adjust the mixer of the burner to the fittings; but by providing the gas-burner with the flanged legs or supports one or both of the legs can be easily removed and the chamber A cut off or shortened at one end, so that the mixer can be easily adjusted to the gas-supply pipe and the leg or support again attached to the end of the chamber. Sometimes the gas-chamber stands too high for the fittings. In cases of that kind, the mixer being made adjustable or telescopic, it can easily be arranged to suit the gas-fittings.

What I claim as of my invention is—

A gas-burner comprising a sheet-metal air and gas chamber having a perforated top and provided with a spreader located centrally therein, an adjustable telescopic mixer adapted to supply air and gas to the burner, and detachable flanged supports for the said chamber.

In testimony whereof I have hereunto set my hand this 8th day of July, A. D. 1891.

HENRY ADLER.

Witnesses:
A. C. JOHNSTON,
C. S. JOHNSTON.